(12) United States Patent
Bauco et al.

(10) Patent No.: US 9,874,671 B2
(45) Date of Patent: Jan. 23, 2018

(54) LIGHT DIFFUSING FIBER LIGHTING DEVICE

(71) Applicant: CORNING INCORPORATED, Corning, NY (US)

(72) Inventors: Anthony Sebastian Bauco, Horseheads, NY (US); Vikram Bhatia, Painted Post, NY (US); Stephan Lvovich Logunov, Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 14/723,763

(22) Filed: May 28, 2015

(65) Prior Publication Data

US 2015/0346411 A1    Dec. 3, 2015

Related U.S. Application Data

(60) Provisional application No. 62/006,959, filed on Jun. 3, 2014.

(51) Int. Cl.
*F21V 8/00* (2006.01)
*F21V 31/00* (2006.01)
(Continued)

(52) U.S. Cl.
CPC ............ *G02B 6/0006* (2013.01); *F21K 9/52* (2013.01); *F21K 9/90* (2013.01); *F21V 31/005* (2013.01);
(Continued)

(58) Field of Classification Search
CPC .... G02B 6/006; G02B 6/4202; G02B 6/0006; G02B 6/001; G02B 6/421; G02B 6/4263; F21V 31/005; F21V 2200/10; F21K 9/52; F21K 9/90; Y10T 29/49828; F21Y 2101/025; F21Y 2115/10; F21Y 2115/30
(Continued)

(56) References Cited

U.S. PATENT DOCUMENTS

| 6,795,461 B1 * | 9/2004 | Blair ................... G02B 6/4292 372/101 |
| 7,450,806 B2 | 11/2008 | Bookbinder et al. |

(Continued)

FOREIGN PATENT DOCUMENTS

| JP | 57028392 | 2/1982 |
| JP | 2010027432 | 2/2010 |
| JP | 2010086789 | 4/2010 |

OTHER PUBLICATIONS

Khoe, Laser-to-monomode-fiber coupling and encapsulation in a modified TO-5 package, IEEE Transactions on Electron Devices, ED-32, 1985, No. 2, pp. 2707-2712.
(Continued)

*Primary Examiner* — Bao Q Truong
(74) *Attorney, Agent, or Firm* — Robert L. Carlson

(57) ABSTRACT

A lighting device is provided that includes a light source package including a diode disposed in a housing and emitting light at an emission point within the housing. The lighting device also has an optical fiber extending through an opening in the housing and having a terminal end optically aligned on an optical axis with the diode to within a distance of less than 1.0 millimeter from the emission point, wherein the fiber emits light via a light diffusing fiber.

20 Claims, 1 Drawing Sheet

(51) Int. Cl.
*F21K 9/90* (2016.01)
*F21K 99/00* (2016.01)
*G02B 6/42* (2006.01)
*F21Y 101/02* (2006.01)

(52) U.S. Cl.
CPC ...... *G02B 6/4202* (2013.01); *F21Y 2101/025* (2013.01); *G02B 6/001* (2013.01); *G02B 6/421* (2013.01); *G02B 6/4263* (2013.01); *Y10T 29/49828* (2015.01)

(58) Field of Classification Search
USPC ......................................................... 362/553
See application file for complete search history.

(56) References Cited

U.S. PATENT DOCUMENTS

| | | | |
|---|---|---|---|
| 7,505,650 B1 | 3/2009 | Grzybowski et al. | |
| 7,505,660 B2 | 3/2009 | Bickham et al. | |
| 7,686,491 B1 * | 3/2010 | Isaacson | A63J 5/02 |
| | | | 362/552 |
| 7,862,219 B2 * | 1/2011 | Mersch | A61B 5/0059 |
| | | | 362/551 |
| 7,930,904 B2 | 4/2011 | Bookbinder et al. | |
| 8,616,023 B2 | 12/2013 | Grzybowski et al. | |
| 9,618,672 B2 * | 4/2017 | Kuchinisky | G02B 6/001 |
| 2003/0118283 A1 * | 6/2003 | Healy | G02B 6/4206 |
| | | | 385/33 |
| 2004/0246744 A1 | 12/2004 | Krupa et al. | |
| 2008/0188843 A1 * | 8/2008 | Appling | A61B 18/24 |
| | | | 606/15 |
| 2009/0091945 A1 | 4/2009 | Kenneth | |
| 2011/0175549 A1 | 7/2011 | Yohhei et al. | |
| 2011/0305035 A1 | 12/2011 | Bickham et al. | |
| 2015/0369991 A1 * | 12/2015 | Bauco | G02B 6/4204 |
| | | | 362/555 |

OTHER PUBLICATIONS

International Search Report, issued in connection with corresponding PCT application No. PCT/US2015/033874, dated Sep. 9, 2015.

* cited by examiner

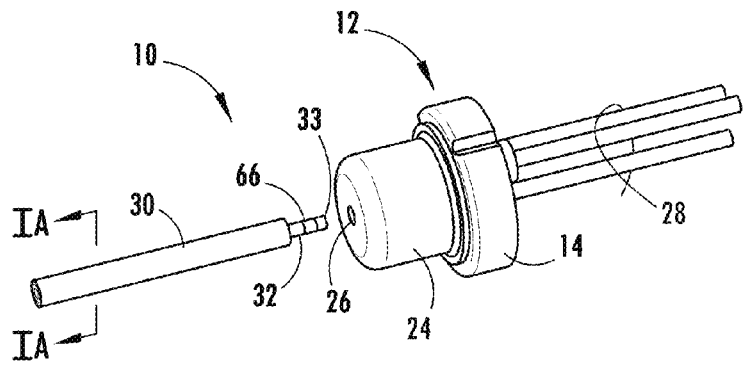
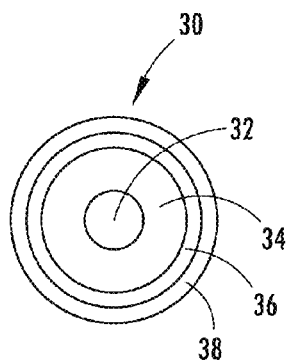
FIGURE 1  FIGURE 1A
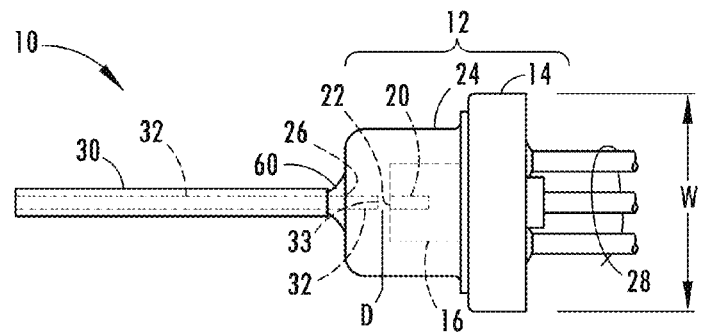
FIGURE 2
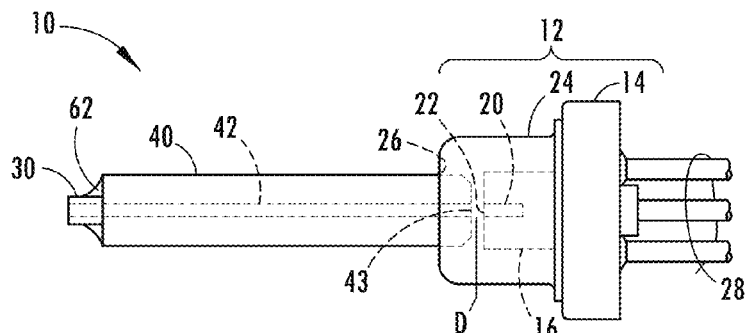
FIGURE 3
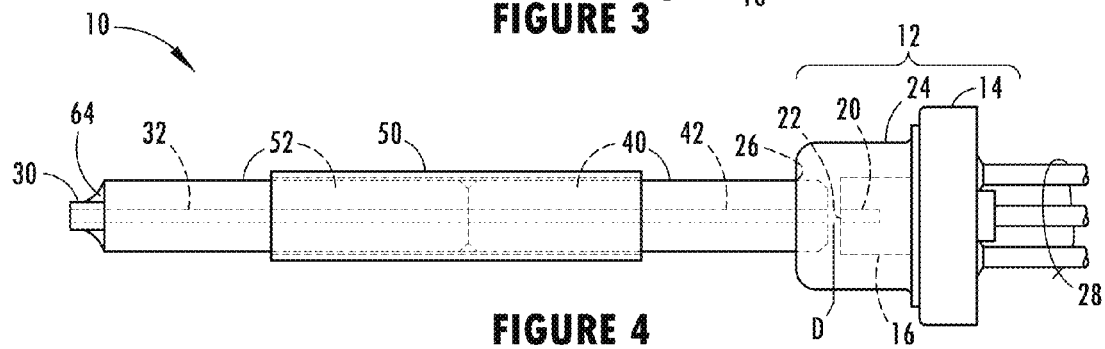
FIGURE 4

LIGHT DIFFUSING FIBER LIGHTING DEVICE

CROSS-REFERENCE TO RELATED APPLICATION

This application claims benefit of U.S. Provisional Application No. 62/006,959, filed Jun. 3, 2014, entitled "LIGHT DIFFUSING FIBER LIGHTING DEVICE." The aforementioned related application is hereby incorporated by reference.

BACKGROUND

This disclosure pertains to a lighting device employing a light diffusing fiber, and more particularly relates to a light source package having a diode optically coupled to a fiber that emits light by way of a light diffusing fiber.

Light diffusing fibers (LDFs) can be used in various applications as light illuminators for accent lighting, indicator lighting and other applications. For compact applications, such as in consumer electronics, a light source in the form of a laser source package may be used. Typically, a plurality of optical lenses is disposed between the laser source package and the light diffusing fiber which increases the size of the device. In addition, it can be expensive to efficiently couple laser light from the laser diode to the fiber with a plurality of optical lenses. It is therefore desirable to provide for a lighting device that illuminates a light diffusing fiber with a light source package that is compact and economical to produce.

SUMMARY

In accordance with one embodiment, a lighting device is provided. The lighting device includes a light source package including a diode disposed in a housing and emitting light at an emission point within the housing. The lighting device also includes an optical fiber extending through an opening in the housing and having a terminal end optically aligned on an optical axis with the diode to within a distance of less than 1.0 millimeter from the emission point, wherein the fiber emits light via a light diffusing fiber.

In accordance with another embodiment, a method of manufacturing a lighting device is provided. The method includes the step of providing a light source package comprising a diode disposed in a housing, wherein the diode emits light at an emission point within the housing. The method also includes the steps of forming an opening in the housing and disposing an optical fiber extending into the opening in the housing and having a terminal end optically aligned on an optical axis with the diode to within a distance of less than 1.0 millimeter from the emission point, wherein the fiber emits light to a light diffusing fiber. The method further includes the step of fixedly connecting the fiber relative to the housing in an optically aligned position such that light is transmitted from the emission point to the fiber.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiments, and together with the description serve to explain principles and operation of the various embodiments.

BRIEF DESCRIPTION OF THE DRAWINGS

FIG. 1 is an exploded perspective view of a lighting device, according to one embodiment;

FIG. 1A is a diagrammatic cross-sectional view taken through line IA-IA of the light diffusing fiber shown in FIG. 1;

FIG. 2 is a side view of the lighting device of FIG. 1 having the laser source package assembled to the light diffusing fiber;

FIG. 3 is a side view of a lighting device having a ferrule coupled between the light diffusing fiber and the laser source package, according to a second embodiment; and FIG. 4 is a side view of a lighting device further having ferrule connectors coupling the fiber to the laser source package, according to a third embodiment.

DETAILED DESCRIPTION

Reference will now be made in detail to the present preferred embodiments, examples of which are illustrated in the accompanying drawings. Whenever possible, the same reference numerals will be used throughout the drawings to refer to the same or like parts.

The following detailed description represents embodiments that are intended to provide an overview or framework for understanding the nature and character of the claims. The accompanied drawings are included to provide a further understanding of the claims and constitute a part of the specification. The drawings illustrate various embodiments, and together with the descriptions serve to explain the principles and operations of these embodiments as claimed.

Referring to FIGS. 1-4, a lighting device 10 is illustrated for providing light illumination generated by a light source shown generally as a laser source package and output by a light diffusing fiber (LDF), according to various embodiments. The lighting device 10 includes a light source package 12 having a diode 20 disposed in a housing 24. In the disclosed embodiments, the light source package 12 is a laser source package having a laser diode 20 mounted within a cylindrical housing 24. The laser diode 20 emits visible light at an emission point within the housing 24. The lighting device 10 also includes an optical fiber 30 extending through an opening 26 in the housing 24 and having a terminal end 33 optically aligned with the laser diode 20 to within a distance of less than 1.0 millimeter from the emission point 22, according to one embodiment. According to a more preferred embodiment, the terminal end 33 of the fiber 30 may be optically aligned with the laser diode 20 to within a distance of less than 0.8 millimeter from the emission point 22.

The optical fiber transmits and emits light via a light diffusing fiber 30. In one embodiment shown in FIG. 2, the optical fiber is a light diffusing fiber 30. According to other embodiments shown in FIGS. 3 and 4, the fiber may be a delivery fiber 42, which in turn is optically coupled to the light diffusing fiber 30. It should be appreciated that one or more delivery fibers may be optically coupled between the diode 20 and the light diffusing fiber 30 such that light generated by diode 20 is transmitted to the light diffusing fiber 30. The delivery fiber 42 may be disposed within a first ferrule 40, which in turn is connected to the housing 24. As seen in the embodiment of FIG. 4, first ferrule 40 may connect to a second ferrule 52 or other connector which is coupled to fiber 30, wherein the ferrules 40 and 52 are connected together in an aligned light coupling position by a sleeve 50. The ferrule 40 may be hermetically sealed to the housing 24.

Referring now to FIGS. 1-2, the lighting device 10 is illustrated having a light diffusing fiber 30 physically and optically connected to a light source package 12, according to a first embodiment. The light source package 12 may include a laser source package in the form of a TO can package. A commercially available TO can package may be modified and coupled to the light diffusing fiber 30 to achieve the lighting device 10 as described herein. The light source package 12 is generally illustrated and described herein as a TO can package having a base 14, and a plurality of input pins 28. The light source package 12 also includes a housing 24 connected to the base 14. The housing 24 may include a cylindrical metal can, according to one embodiment, which may be laser welded or otherwise connected onto the base 14 to provide a hermetic seal between the base 14 and the housing 24. Disposed within the sealed housing 24 is a diode 20, shown and described herein as a laser diode according to one embodiment that may be assembled onto a supporting substrate 16 which, in turn, is connected to the base 14. The laser diode 20 receives electrical power via the input pins 28 and generates a laser light emission at an emission point 22 within the housing 24. The laser diode 20 may generate a colored light such as blue or green light. The base 14 may be made of a thermally conductive material, such as aluminum, to dissipate thermal energy from the diode 20 to the outside ambient environment. While a laser source package 12 having a laser diode 20 is shown and described herein, according to one embodiment, it should be appreciated that the light source package may be configured with other light sources such as an LED package employing a light emitting diode.

The laser source package 12 preferably has a compact size with height and length dimensions sufficiently small to enable use in small devices or applications such as consumer electronics (e.g., cell phone). The light source package 12 may include a commercially available TO can package which is typically available with the further addition of a glass window aligned with the light outlet. The commercially available TO can package may be used with a copper housing and multiple optic lenses which generally adds increased length and height to the overall package. Examples of a TO can package include commercially available 3.3 mm and a 3.8 mm TO can packages. When using a commercially available TO can package, an outer copper housing (not shown) and the glass window (not shown) may be removed and not employed, and the fiber 30 may be attached to housing 24 and optically aligned with the laser diode 20 without the need for additional optical lenses to provide an efficient optical coupling in a compact and inexpensive lighting device. The light source package 24 may have a width W of less than 4.0 millimeters, and more preferably the width W is 3.8 millimeters or less. The light diffusing fiber 30 may be of any suitable length to provide sufficient illumination for a given application.

The light source package 12 may be configured to include an opening 26 in the front end of housing 24 sufficient to enable the insertion of fiber 30 into the opening 26 within housing 24 and into an optically aligned position with the emission point 22 of laser diode 20. The opening 26 is sized having a diameter the same as or slightly greater than the diameter of the stripped and metallized portion of the fiber 30 to allow insertion of that portion of the fiber 30 through opening 26. Opening 26 may be formed by drilling a hole into the end wall of the housing 24 or may otherwise be configured by punching, molding, etc. In a TO can package, the opening 26 may be the opening at the light outlet once the glass window is removed.

The fiber 30 may be connected to the housing 24 by stripping off outer coatings of the fiber 30 over a short length at the terminal end 33 in a coating chamber and applying a metal coating using metallization with a sputter coating process to the outside glass surface of the fiber core 32 or cladding. The metallized portion of the fiber 30 may act as an efficient metal waveguide with low light scattering and absorption. The scattering may be determined by how well the metal wets the glass surface and the quality of the glass surface. The fiber surface is preferably very smooth. The metallization may include silver which provides a low absorption at the glass/metal interface in the visible spectrum. The metalized outer surface 66 of the fiber 32 is then welded or bonded to the metal housing 24 to provide a hermetic seal between the fiber 30 and housing 24, with the terminal end 22 of fiber 30 being aligned with laser diode 20. The terminal end 33 of fiber 30 is optically aligned on an optical axis with the diode 20 to within a distance D of less than 1.0 millimeters from the emission point 22, according to one embodiment. According to another embodiment, the distance D between the emission point 22 and the terminal end 33 of fiber 30 is less than 0.8 millimeter. The distance D between the emission point 22 and the terminal end 33 of the fiber 30 may be reduced to a distance of approximately 0.12 millimeter, according to a further embodiment, which may further improve the light coupling efficiency. For a fiber having a diameter of 105 micrometers and an NA of 0.17, a lighted coupling efficiency of sixty to seventy percent (60-70%) may be realized. If the fiber 30 is a double clad fiber, with the inner glass clad having an NA of 0.53 relative to an outer polymer clad, the light coupling efficiency may be approximately ninety to ninety five percent (90-95%). The laser diode 20 may be a spatially single mode laser diode having a beam waist of less than 10 micrometers and a NA of less than 0.5 which may be used to illuminate a multi-moded light diffusing fiber 30 having a diameter in the range of 105 to 200 micrometers and NA in the range of 0.17 to 0.53, according to one embodiment. The multimode fiber may be multimoded at a wavelength of one or both of 850 nanometers and 1,550 nanometers. Given a distance of approximately 850 micrometers between the fiber facet and the laser diode emission point 22, the light coupling efficiency may be limited in an attempt to achieve a compact lighting device. It should be appreciated that there are no optical lenses disposed between the emission point 22 and the terminal end 33 of fiber 30.

Once the optical fiber 30 is disposed within opening 26 of housing 24 and aligned with the laser diode 20, the metalized outer surface 66 of fiber 30 may be welded to metal housing 24. In addition, a low index adhesive 60 may be applied to the fiber 30 and housing 24 to cover and adhere the outer surface of the fiber 30 to the housing 24 and to cover the metalized weld. The lighting device 10 may then be assembled into a device such as a consumer electronics device or employed in another application to provide a compact and inexpensive lighting device. It should be appreciated that the light diffusing fiber 30 may have various shapes and sizes to accommodate dimensions of the device and lighting application.

In the various disclosed embodiments, the lighting device 10 includes a light diffusing fiber 30 operatively coupled to the diode 20 to receive the light generated by the diode 20 at emission point 22 and disperses the light for a lighting application. The light diffusing fiber 30 is a high scatter light transmission fiber that receives the light generated by diode 20 and scatters and outputs the light. The high scatter light transmission achieved with the light diffusing fiber 30 has a light attenuation of 0.5 dB/meter or greater, according to one embodiment.

The light diffusing fiber 30 may be configured as a single light diffusing fiber. The light diffusing fiber 30 may be a multimode fiber having a diameter, for example, in the range of 105 to 200 micrometers and may be flexible, thus allowing ease in installation to the housing 24. In one embodiment, the light diffusing fiber 30 has a diameter of 1,000 microns or less, and more particularly of about 250 microns or less. In other embodiments, the light diffusing fiber 30 may be more rigid and have a diameter greater than 1,000 microns.

One embodiment of a light diffusing fiber 30 is illustrated having a typical cross-sectional structure as shown in FIG. 1A. The light diffusing fiber 30 may include the formation of random air lines or voids in one of the core and cladding of a silica fiber. Examples of techniques for designing and forming such light diffusing fibers may be found, for example, in U.S. Pat. Nos. 7,450,806; 7,930,904; and 7,505,660, and U.S. Patent Application Publication No. 2011/0305035, which are hereby incorporated by reference in their entirety. The light diffusing fiber 30 has a $SiO_2$ glass core 32 which may include a Ge-doped or F-doped core. An $SiO_2$ cladding layer 34 having air lines for scattering light is shown surrounding the core 32. The cladding layer 34 may be formed to include air lines or voids to scatter the light and direct the light through the side walls. It should be appreciated that the random air lines may be disposed in the core 32 or in the cladding 34 or in both, according to various embodiments. It should be appreciated that high scattering light losses are generally preferred in the light diffusing fiber 30. A low index polymer primary protective layer 36 generally surrounds the cladding layer 34. Additionally, an outer secondary layer 38 may be disposed on the primary protective layer 36. Primary protective layer 36 may be soft and liquidy, while secondary layer 38 may be harder.

Scattering loss of the light diffusing fiber 30 may be controlled throughout steps of fiber manufacture and processing. During the air line formation process, the formation of a greater number of bubbles will generally create a larger amount of light scatter, and during the draw process the scattering can be controlled by using high or low tension to create higher or lower light loss, respectively. To maximize loss of light, a polymeric cladding may be desirably removed as well, over at least a portion of the light diffusing fiber 30 length if not all. Uniform angular loss in both the direction of light propagation, as well as in the reverse direction can be made to occur by coating the light diffusing fiber 30 with inks that contain scattering pigments or molecules, such as $TiO_2$. The high scattering light diffusing fiber 30 may have a modified cladding to promote scattering and uniformity. Intentionally introduced surface defects on the light diffusing fiber 30 or core or cladding may also be added to increase light output, if desired.

The light diffusing fiber 30 may have a region or area with a large number (greater than 50) of gas filled voids or other nano-sized structures, e.g., more than 50, more than 100, or more than 200 voids in the cross section of the fiber. The gas filled voids may contain, for example, $SO_2$, Kr, Ar, $CO_2$, $N_2$, $O_2$, or mixture thereof. The cross-sectional size (e.g., diameter) of the nano-size structures (e.g., voids) may vary from 10 nanometers to 1 micrometer (for example, 15 nanometers to 500 nanometers), and the length may vary depending on the area to be illuminated.

While the light diffusing fiber 30 is shown and described herein having air lines, it should be appreciated that other light scattering features may be employed. For example, high index materials such as $GeO_2$, $TiO_2$, $ZrO_2$, ZnO, and others may be employed to provide high scatter light transmission.

The lighting device 10 may further include a low scatter light transmission fiber, referred to as light delivery fiber 42, coupled between the diode 20 and the light diffusing fiber 30 shown in the embodiments of FIGS. 3 and 4. According to one embodiment, the delivery fiber 42 may include an optical fiber designed to transmit light with low signal loss. The low scatter light transmission achieved with the delivery fiber 42 has a light attenuation of less than 0.5 dB/meter. The delivery fiber 42 may be coupled to the light diffusing fiber 30 by way of an aligned optical coupling. It should be appreciated that the low scatter light transmission or delivery fiber 42 may be operatively coupled to the light diffusing fiber 30 using various optical connections including splices, butt couplings, optical couplings, and other light transmission couplings.

Referring to FIG. 3, a lighting device 10 is illustrated employing a ferrule 40 having a delivery fiber 42 interposed between the light diffusing fiber 30 and the light source package 12. In this embodiment, the light source package 12 has an opening 26 formed with a greater diameter as compared to the opening in the first embodiment sized and shaped to receive the ferrule 40. The remainder of the light source package 12 may remain the substantially same as shown and described in the other embodiments and may include a TO can package as described above. The ferrule 40 may include a cylindrical metal housing that fits within the opening 26 of housing 24 and may be welded thereto to form a hermetic seal between the ferrule 40 and the housing 24. It should be appreciated that the ferrule 40 may be made of other materials, such as ceramic or glass, according to other embodiments and may otherwise be connected and sealed to the housing 24. Disposed within the ferrule 40 is a fiber 42 shown and described herein as a delivery fiber, according to one embodiment. The fiber 42 may be a light diffusing fiber, according to another embodiment. In a further embodiment, a graded index (GRIN) lens may be disposed within the ferrule 40 in place of the fiber 42 or in addition to the fiber 42. The delivery fiber 42 may include a core and cladding that has a terminal end 43 optically aligned on an optical axis with the diode 20 to within a distance D of less than 1.0 millimeter from the emission point 22, according to one embodiment. According to another embodiment, the distance D between the emission point 22 and the terminal end 43 of fiber 40 is less than 0.8 millimeter. In this embodiment, it should be appreciated that there are also no optical lenses disposed between the emission point 22 and the terminal end 43 of fiber 42. If the GRIN lens is employed, the GRIN lens may be optically aligned on an optical axis with the diode to within a distance D of less than 1.0 millimeter, or more preferably less than 0.8 millimeter.

At the opposite end of the ferrule 40 is a light diffusing fiber 30 which is shown optically coupled to the delivery fiber 42. The coupling between the light diffusing fiber 30 and light delivery fiber 42 may be achieved by aligning the fibers 30 and 42 along an optical axis and optically coupling the fibers 30 and 40 relative to one another. The optical coupling may include a butt coupling. A low index adhesive 62 may further adhere the light diffusing fiber 30 to the end of the delivery fiber 42 and ferrule 40 to hold the fibers 30 and 42 together.

According to one embodiment, the fiber 42 may be formed within the ferrule 40 and the light diffusing fiber 30 may be assembled with the ferrule 40 attached thereto. The ferrule 40 may be inserted within opening 26 of housing 24 so as to optically align the fiber 42 with diode 20. The ferrule 40 may then be welded or otherwise adhered to the housing 24 within opening 26. For a ceramic or other non-metal ferrule, the ferrule 42 may be metallized prior to welding so as to attach hermetically to the housing 24. Alternatively, the ferrule 40 and fiber 42 may be hermetically connected to the housing 24 and aligned to provide optimum light coupling between the diode 20 and the terminal end 43 of fiber 42. Thereafter, the light diffusing fiber 30 may be coupled to the fiber 42 at the opposite end of ferrule 40 and adhered thereto with the low index adhesive 62.

Referring to FIG. 4, the lighting device 10 is illustrated having the light source package 12 connected to a first ferrule 40 which, in turn, is aligned and connected to a second ferrule 52. The first ferrule 40 may be connected to the housing 24 and may have a delivery fiber 42 optically aligned with respect to the diode 20 as discussed above with respect to the second embodiment of FIG. 3. In addition, the first ferrule 40 is removably connected with the second ferrule 52 which, in turn, is coupled to the light diffusing fiber 30 via an optical coupling and the low index adhesive 64. The first and second ferrules 40 and 52 are configured to align to allow optical fibers within each of the first and second ferrules 40 and 52 to efficiently couple light therebetween. In addition, an outer connector sleeve 50 surrounds the first and second ferrules 40 and 52 to maintain the first and second ferrules 40 and 52 in a fixed and aligned position. It should be appreciated that the sleeve 50 may include a tube having a longitudinal opening that allows the tube to flex and compress over the ferrules 40 and 52 to frictionally engage the ferrules 40 and 52. The sleeve 50 may have threads or other engagement mechanism for maintaining the position of the first and second ferrules 40 and 52 relative to one another. In lieu of the second ferrule 52, another connecting device may be employed to connect the light diffusing fiber 30 to the first ferrule 40. For example, telecommunications connectors such as ST, FC, or SMA connectors may be employed. In either embodiment, the second ferrule containing the light diffusing fiber may be slid into a mechanical mating mechanism, such as a mating sleeve or other receptacle which contains the first ferrule and is integrated with the laser diode package 12. While first and second ferrules are shown in this embodiment, it should be appreciated that additional connectors or ferrules may be coupled between the light source package 12 and the light diffusing fiber 30, and that two or more delivery fibers may be used.

Accordingly, the lighting device 10 advantageously couples light from a light source package, such as a TO can package, to a light diffusing fiber to provide light illumination. The lighting device 10 may employ an existing TO can package without the need for a plurality of optical lenses which results in a significant size reduction and allows for a compact and economical to manufacture device. The lighting device has a sufficiently small width and length such that it may be advantageously employed in any of a number of applications such as in a cell phone.

Various modifications and alterations may be made to the examples within the scope of the claims, and aspects of the different examples may be combined in different ways to achieve further examples. Accordingly, the true scope of the claims is to be understood from the entirety of the present disclosure in view of, but not limited to, the embodiments described herein.

It will be apparent to those skilled in the art that various modifications and variations can be made without departing from the spirit or scope of the claims.

What is claimed is:

1. A lighting device comprising:
    a light source package comprising a diode disposed in a housing, the diode emitting light at an emission point within the housing; and
    an optical fiber extending through an opening in the housing and having a terminal end optically aligned on an optical axis with the diode to within a distance of less than 1.0 millimeter from the emission point, wherein the fiber emits light via a light diffusing fiber having a light attenuation of 0.5 dB/meter or greater.

2. The lighting device of claim 1, wherein the fiber is a light diffusing fiber.

3. The lighting device of claim 1, wherein the fiber is a delivery fiber that is optically coupled to the light diffusing fiber.

4. The lighting device of claim 3 further comprising a first ferrule connected to the housing and having the delivery fiber disposed in the first ferrule.

5. The lighting device of claim 4 further comprising a second ferrule connected to a second fiber, wherein the first and second ferrules are connected together by a connector in an aligned position.

6. The lighting device of claim 5, wherein the first ferrule is hermetically sealed to the housing.

7. The lighting device of claim 1, wherein the fiber is a multimode fiber.

8. The lighting device of claim 1, wherein the fiber comprises a core having a diameter greater than 20 microns.

9. The lighting device of claim 1, wherein the light source package is a TO can package comprising a laser diode.

10. The lighting device of claim 1, wherein the light source comprises a laser source comprising a laser diode.

11. The lighting device of claim 1, wherein the fiber is hermetically sealed to the housing.

12. The lighting device of claim 1, wherein there is no optical lens disposed between the terminal end of the fiber and the emission point of the diode.

13. The lighting device of claim 1 further comprising a low index adhesive disposed between the fiber and the housing.

14. A method of manufacturing a lighting device comprising:
    providing a light source package comprising a diode disposed in a housing, wherein the diode emits light at an emission point within the housing;
    forming an opening in the housing;
    disposing an optical fiber extending into the opening in the housing and having a terminal end optically aligned on an optical axis with the diode to within a distance of less than 1.0 millimeters from the emission point, wherein the fiber emits light to a light diffusing fiber having a light attenuation of 0.5 dB/meter or greater; and fixedly connecting the fiber relative to the housing in an optically aligned position such that light is transmitted from the emission point to the fiber.

15. The method of claim 14, wherein the fiber is a light diffusing fiber.

16. The method of claim 14, wherein the fiber is a delivery fiber that is optically coupled to the light diffusing fiber.

17. The method of claim 16 further comprising the step of coupling a first ferrule to the housing such that the fiber extends through the opening, wherein the delivery fiber extends through the ferrule.

18. The method of claim 17 further comprising a second ferrule connected to a second fiber, wherein the first and second ferrules are connected together by a connector in an aligned position.

19. The method of claim 14, wherein the laser source package is a TO can package.

20. The lighting device of claim 14, wherein the light source comprises a laser source comprising a laser diode.

* * * * *